(12) United States Patent
Sumi et al.

(10) Patent No.: US 9,047,720 B2
(45) Date of Patent: Jun. 2, 2015

(54) VEHICLE DATA GATHERING APPARATUS, AND VEHICLE DATA GATHERING METHOD

(71) Applicant: HONDA MOTOR CO., LTD., Tokyo (JP)

(72) Inventors: Ryuichiro Sumi, Tokyo (JP); Erito Nagata, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/376,182

(22) PCT Filed: Oct. 1, 2012

(86) PCT No.: PCT/JP2012/075331
§ 371 (c)(1),
(2) Date: Aug. 1, 2014

(87) PCT Pub. No.: WO2013/125085
PCT Pub. Date: Aug. 29, 2013

(65) Prior Publication Data
US 2014/0371977 A1    Dec. 18, 2014

(30) Foreign Application Priority Data

Feb. 22, 2012  (JP) .................................. 2012-036347

(51) Int. Cl.
*G07C 5/00*      (2006.01)
*G01M 17/007*   (2006.01)

(52) U.S. Cl.
CPC ............. *G07C 5/008* (2013.01); *G01M 17/007* (2013.01)

(58) Field of Classification Search
CPC .......... G08G 1/00; G08G 1/20; H04W 4/008; G06F 17/00; G06F 3/0484; G06Q 30/018; H04L 67/12; G07C 5/00; G07C 5/0858; G07C 7/00; G09B 5/00; G09B 19/167
See application file for complete search history.

(56) References Cited

U.S. PATENT DOCUMENTS 5,491,631 A    2/1996  Shirane et al.
6,321,148 B1  11/2001  Leung
(Continued)

FOREIGN PATENT DOCUMENTS

CN    101853021 A  * 10/2010
JP    10-274602 A     10/1998
(Continued)

OTHER PUBLICATIONS

International Search Report dated Dec. 25, 2012 corresponding to International Patent Application No. PCT/JP2012/075331 and English translation thereof.

*Primary Examiner* — Mary Cheung
*Assistant Examiner* — Rodney Butler
(74) *Attorney, Agent, or Firm* — Squire Patton Boggs (US) LLP

(57) ABSTRACT

A vehicle data gathering apparatus that implements a vehicle data gathering method includes: a bus use rate detection means connected to an in-vehicle network for detecting a bus use rate in the in-vehicle network; a selection setting means for selecting and setting a plurality of data request signals to be transmitted to at least one of a plurality of ECUs; a transmission interval setting means for setting a uniform transmission interval for each data request signal in a predetermined period on the basis of the number of the data request signals set by the selection setting means; and a request signal transmission means for transmitting each data request signal at the set uniform interval when it is determined that the bus use rate is lower than a first threshold value.

5 Claims, 10 Drawing Sheets

(56) References Cited

U.S. PATENT DOCUMENTS

| | | | |
|---|---|---|---|
| 6,633,784 B1* | 10/2003 | Lovelace et al. | 700/65 |
| 6,931,309 B2* | 8/2005 | Phelan et al. | 701/1 |
| 2004/0243285 A1* | 12/2004 | Gounder | 701/1 |
| 2005/0137796 A1* | 6/2005 | Gumpinger | 701/211 |
| 2005/0190467 A1* | 9/2005 | Noguchi | 360/1 |
| 2008/0306650 A1 | 12/2008 | Nakagaki | |
| 2009/0041047 A1 | 2/2009 | Augustin et al. | |
| 2009/0228170 A1* | 9/2009 | Taki | 701/33 |
| 2011/0191392 A1* | 8/2011 | Kameda et al. | 707/812 |

FOREIGN PATENT DOCUMENTS

| | | |
|---|---|---|
| JP | 2007-038816 A | 2/2007 |
| JP | 2008-070133 A | 3/2008 |
| JP | 2008-304367 A | 12/2008 |
| JP | 2009-8667 A | 1/2009 |
| JP | 2009-264770 A | 11/2009 |

* cited by examiner

VEHICLE DATA GATHERING APPARATUS, AND VEHICLE DATA GATHERING METHOD

TECHNICAL FIELD

The present invention relates to an external vehicle data collecting (gathering) apparatus and a vehicle data collecting (gathering) method for collecting data from a vehicle and storing the data.

BACKGROUND ART

In case a vehicle develops an abnormal symptom while the vehicle is driving, it is customary to energize a waning lamp on the instrument panel of the vehicle to give a warning or the like to the driver. On account of the abnormal symptom or the warning, the user takes the vehicle to the dealer or a repair shop where the vehicle is diagnosed or repaired.

The operator (technician) who is responsible for repairing the vehicle connects a fault diagnosing apparatus to an electronic control unit (hereinafter referred to as "ECU") on the faulty vehicle, and reads out information such as a trouble code or the like of the fault that was stored in the ECU at the time of occurrence of the fault, thereby identifying a faulty system, i.e., an electric circuit undergoing the fault, with relative ease. Fault diagnosing apparatus of the type described above are widely used in the art. One such fault diagnosing apparatus is disclosed in U.S. Pat. No. 5,491,631 (hereinafter referred to as "U.S. Pat. No. 5,491,631 A"), for example.

There is a situation where though the user of a vehicle has complained about an abnormal symptom several times, there is no trouble code recorded, and the technician in charge fails to recreate the symptom despite attempts made to recreate the symptom in view of the complaint and hence finds it difficult to repair the vehicle.

To deal with a repair difficulty, a large-capacity storage device as disclosed in Japanese Laid-Open Patent Publication No. 2008-070133 (hereinafter referred to as "JP 2008-070133 A") is temporarily connected to the ECU of a vehicle in question, and the user of the vehicle is asked to drive the vehicle for several days. While the vehicle is driven, data required for a fault diagnosis (driving parameter data) are collected in the storage device. The collected data are analyzed using a fault diagnosing machine or a fault analyzing apparatus to make a detailed diagnosis of the vehicle.

Driving parameter data are collected by a sequence of periodic exchanges of requests sent to a system control ECU for internal information and data sent from the system control ECU in response to the requests. If the fault diagnosing machine is to communicate with one or more certain ECUs through an intravehicular network, e.g., a CAN, to which a plurality of ECUs are connected, then the communications pose a new burden on the intravehicular network and tend to increase the bus usage rate.

Depending on the way in which the vehicle is driven, the bus usage rate may become temporarily so high that it may not be possible to obtain driving parameter data due to network congestion.

In case driving parameter data cannot be obtained, a vehicle data collecting apparatus disclosed in JP 2008-070133 A sends a request for resending data as indicated in FIGS. 13, 14 and paragraphs [0050] through [0053] of JP 2008-070133 A. In other words, the disclosed vehicle data collecting apparatus attempts to collect as much data as possible continuously even if responses are delayed or are not produced. If data come in an increased number of types or in an increased size, then those data which are less important are allowed to drop out for strictly synchronous periodic data retrieval.

SUMMARY OF INVENTION

However, the above solution may possibly lead to a loss of continuity between received driving parameter data. If driving parameter data continuity is lost, then since the data that have dropped out cannot be used for a data analysis, the accuracy of the analysis tends to be lowered.

Furthermore, it is necessary to take enough care to prevent the high bus usage rate of the intravehicular network from interrupting data communications for the driving of the vehicle.

The present invention has been made in view of the above difficulties. It is an object of the present invention to provide a vehicle data collecting apparatus and a vehicle data collecting method which are capable of at least one of keeping continuity between collected driving parameter data and avoiding network congestion in data communications for the driving of a vehicle.

According to the present invention, there is provided an external vehicle data collecting apparatus removably connected externally to an intravehicular network to which a plurality of electronic control units, hereinafter referred to as ECUs, are connected in a vehicle, for transmitting a plurality of data request signals for requesting driving parameter data representing operating states of various components of the vehicle while the vehicle is being driven, to at least one of the ECUs, receiving driving parameter data in response to the data request signals, and storing the received driving parameter data in a storage unit, the external vehicle data collecting apparatus comprising a bus usage rate detecting unit connected to the intravehicular network and configured to detect a bus usage rate of the intravehicular network, a selecting and setting unit configured to select and set the data request signals to be transmitted to the at least one of the ECUs, a transmission interval setting unit configured to set equal transmission intervals in a predetermined period with respect to each of the data request signals based on the number of the data request signals set by the selecting and setting unit, and a request signal transmitting unit configured to transmit the data request signals at the equal transmission intervals if the bus usage rate is judged as being smaller than a first threshold value.

According to the present invention, if the bus usage rate of the intravehicular network is judged as being smaller than the first threshold value, the data request signals are transmitted to at least one of the ECUs. Therefore, the data collecting apparatus can collect driving parameter data without limiting communications between the ECUs or collect driving parameter data while minimizing limitations on communications between the ECUs, at the time of driving the vehicle. It is thus easy to prevent data communications for driving the vehicle from being congested while the vehicle is being driven.

According to the present invention, furthermore, the data request signals are transmitted at the equal intervals established based on the number of the data request signals. Consequently, it is possible to prevent the bus usage rate from being temporarily increased sharply by the transmission of data request signals and the outputting of driving parameter data. The data collecting apparatus is thus capable of avoiding an interruption of communications owing to a temporary sharp increase in the bus usage rate, and makes it easy to keep continuity of driving parameter data.

The bus usage rate detecting unit may calculate the bus usage rate by detecting a communication volume on the intravehicular network at same intervals as the equal transmission intervals, and the request signal transmitting unit may abort transmission of the data request signals if the bus usage rate is judged as exceeding the first threshold value, judge at the equal transmission intervals whether the bus usage rate is smaller than a second threshold value that is equal to or smaller than the first threshold value, and resume the transmission of the data request signals at the equal transmission intervals if the bus usage rate becomes smaller than the second threshold value.

Consequently, the transmission periods of the data request signals do not change around the time when the transmission of a data request signal is aborted due to an increase in the bus usage rate. Even if driving parameter data drop out due to the aborted transmission of a data request signal, it is easy to interpolate the driving parameter data that have dropped out.

The selecting and setting unit may select and set data request signals for driving parameter data altogether with respect to each defect symptom. Therefore, it is simple to select data request signals to be sent and to set transmission intervals.

According to the present invention, there is also provided a vehicle data collecting method in which a vehicle data collecting apparatus connected externally to an intravehicular network to which a plurality of ECUs are connected in a vehicle, transmits a plurality of data request signals for requesting driving parameter data representing operating states of various components of the vehicle while the vehicle is being driven, to at least one of the ECUs, receives driving parameter data in response to the data request signals, and stores the received driving parameter data in a storage unit, the vehicle data collecting method comprising a bus usage rate detecting step of detecting a bus usage rate of the intravehicular network by the vehicle data collecting apparatus connected to the intravehicular network, a selecting and setting step of selecting and setting the data request signals to be transmitted from the vehicle data collecting apparatus to the at least one of the ECUs, a transmission interval setting step of setting equal transmission intervals in a predetermined period with respect to each of the data request signals based on the number of the data request signals set by the selecting and setting step, and a request signal transmitting step of transmitting the data request signals at the equal transmission intervals if the bus usage rate is judged as being smaller than a first threshold value.

According to the present invention, there is further provided a vehicle data collecting method for collecting intravehicular data for use in a vehicle diagnosis that is at least one of a fault diagnosis, a checkup, and a driving skill diagnosis to be performed externally on a vehicle having an intravehicular network to which a plurality of ECUs are connected, the vehicle data collecting method comprising an item setting step of setting a diagnostic item to be diagnosed by an external diagnosing machine, a request signal identifying step of identifying data request signals with respect to a plurality of items for requesting any of the ECUs for the intravehicular data about the plurality of items corresponding to the diagnostic item, a data requesting step of transmitting a plurality of the data request signals with respect to the plurality of items to at least one of the ECUs from the external diagnosing machine or a vehicle-mounted link which operates in response to a command from the external diagnosing machine, an intravehicular data transmitting step of transmitting a plurality of the intravehicular data from each of the ECUs which have received the data request signals to the external diagnosing machine or the vehicle-mounted link, and an intravehicular data storing step of storing the intravehicular data which have been received directly from the ECUs or the intravehicular data which have been received through the vehicle-mounted link, in the external diagnosing machine, wherein the data requesting step comprises a transmission interval setting step of setting transmission intervals for the data request signals with respect to the plurality of items which are identified depending on the diagnostic item, a bus usage rate detecting step of detecting a bus usage rate of the intravehicular network, a bus usage judging step of judging whether the bus usage rate is smaller than a first threshold value or not, and a request signal transmitting step of transmitting the data request signals at the transmission intervals if the bus usage rate is judged as being smaller than the first threshold value, and wherein the transmission interval setting step sets the transmission intervals for transmitting the data request signals with respect to the plurality of items at equal intervals in a data collecting period which is a period established to acquire each piece of the intravehicular data with respect to the plurality of items.

DESCRIPTION OF EMBODIMENTS

A. Embodiment
1. Configuration
(1-1. Overall Configuration)

Figure 1:
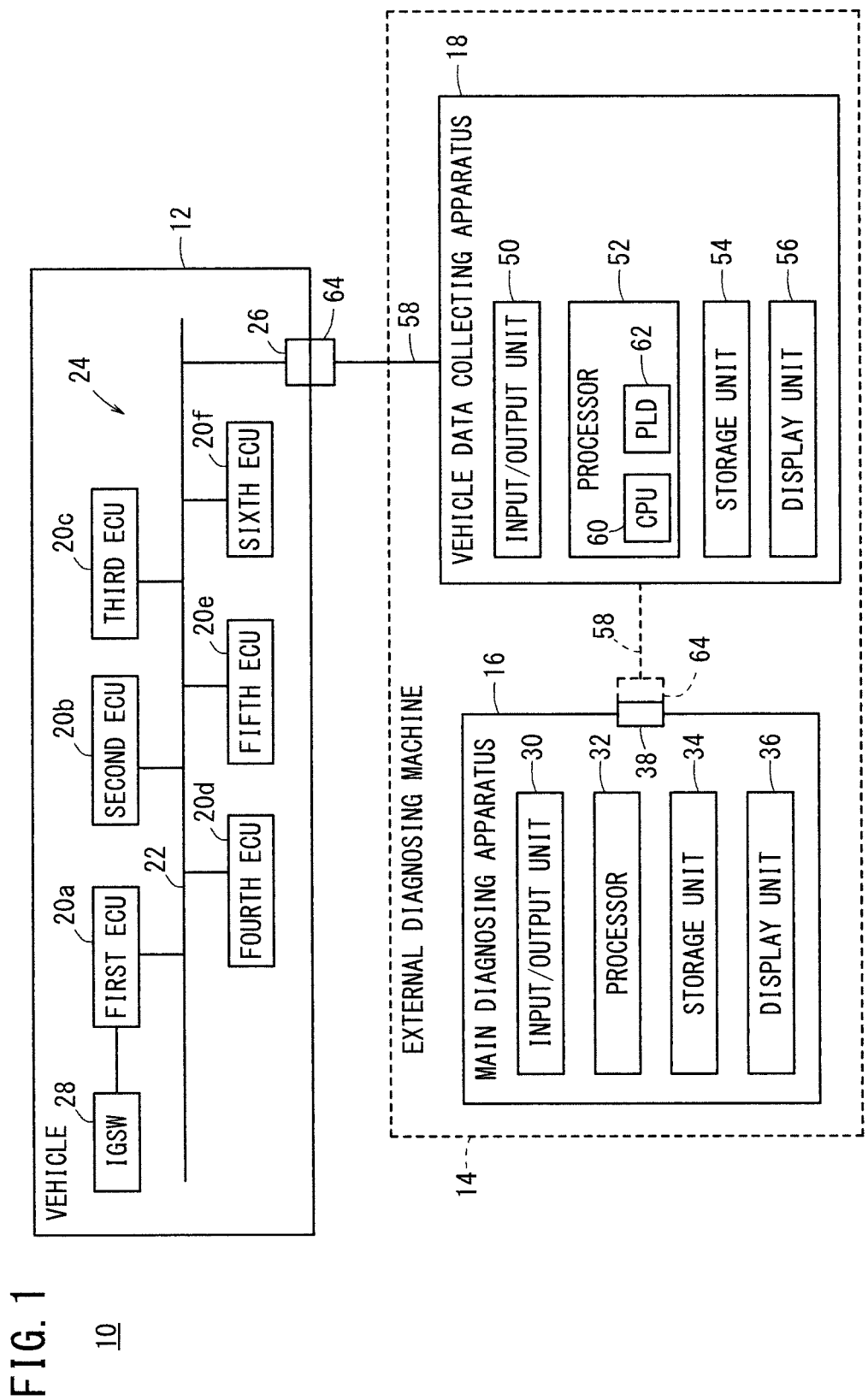
FIG. 1 is a block diagram showing a general configuration of a vehicle diagnosing system including a vehicle data collecting apparatus according to an embodiment of the present invention.

FIG. 1 is a block diagram showing a general configuration of a vehicle diagnosing system 10 (hereinafter also referred to as "system 10") including a vehicle data collecting apparatus 18 (hereinafter also referred to as "data collecting apparatus 18") according to an embodiment of the present invention. The system 10 has a vehicle 12 as an object to be diagnosed and an external diagnosing machine 14 for performing a fault diagnosis on the vehicle 12 from outside of the vehicle 12. The external diagnosing machine 14 has a main diagnosing apparatus 16 (hereinafter also referred to as "main apparatus 16") and the data collecting apparatus 18 (data logger).

(1-2. Vehicle 12)

The vehicle 12 according to the present embodiment is a self-propelled four-wheeled vehicle as a hybrid vehicle having a driving engine and a traction motor (both not shown). Alternatively, the vehicle 12 may be a vehicle such as a gasoline-powered vehicle having no traction motor but an engine, an electric automobile (including a fuel cell vehicle), or the like, or a vehicle such as a self-propelled two-wheeled vehicle, a self-propelled three-wheeled vehicle, or the like.

The vehicle 12 has a plurality of electronic control units 20a through 20f (hereinafter referred to as "first through sixth ECUs 20a through 20f" or "ECUs 20a through 20f" or collectively as "ECUs 20") for controlling the vehicle 12. In FIG. 1, only six ECUs 20a through 20f are shown for an easier understanding of the present invention. However, the vehicle 12 may have other ECUs 20, and the number of ECUs 20 on the vehicle 12 may range from 2 to several hundreds.

The ECUs 20 include, for example, an engine electronic control unit (hereinafter referred to as "engine ECU"), a motor electronic control unit (hereinafter referred to as "motor ECU"), a vehicle stability assist electronic control unit (hereinafter referred to as "VSA ECU"), an antilock brake system electronic control unit (hereinafter referred to as "ABS ECU"), an electric power steering electronic control unit (hereinafter referred to as "EPS ECU"), a battery electronic control unit (hereinafter referred to as "battery ECU"), a meter electronic control unit (hereinafter referred to as "meter ECU"), an air conditioner electronic control unit (hereinafter referred to as "air conditioner ECU"), a supplemental restraint system electronic control unit (hereinafter referred to as "SRS ECU"), an immobilizer electronic control unit (hereinafter referred to as "immobilizer ECU"), etc.

The engine ECU controls the output power of an engine, not shown. The motor ECU controls the output power of a traction motor, not shown. The VSA ECU performs a vehicle stability assist control process. The ABS ECU performs an antilock brake control process. The EPS ECU performs a steering assist control process. The battery ECU controls the charging and discharging of a high-voltage battery or a low-voltage battery, not shown. The meter ECU controls a meter display device, not shown, on an instrument panel, not shown. The air conditioner ECU controls an air conditioner, not shown. The SRS ECU controls an air bag system, not shown. The immobilizer ECU controls an immobilizer device and a smart key system, not shown.

Each of the ECUs 20 has an input/output unit, a processor, a storage unit, etc. The ECUs 20 are interconnected by a communication bus 22, making up an intravehicular network 24. The intravehicular network 24 according to the present embodiment is configured as a CAN (Controller Area Network). Alternatively, the present invention is applicable to other networks including a LIN (Local Interconnect Network), FlexRay, etc. The communication bus 22 has a data link connector 26, e.g., a USB connector, disposed in the passenger compartment of the vehicle 12.

An ignition switch 28 (hereinafter referred to as "IGSW 28") is connected to the first ECU 20a. When the ignition switch 28 is turned on, the first ECU 20a is activated to control the turning-on and turning-off of the other ECUs 20b through 20f.

(1-3. External Diagnosing Machine 14)

As described above, the external diagnosing machine 14 has the main diagnosing apparatus 16 and the data collecting apparatus 18.

(1-3-1. Main Diagnosing Apparatus 16)

(1-3-1-1. Overview)

The main diagnosing apparatus 16 makes various settings (operation setting, etc.) for the data collecting apparatus 18 and performs a fault diagnosis by analyzing driving parameter data D (hereinafter also referred to as "data D") collected by the data collecting apparatus 18. The main diagnosing apparatus 16 may alternatively perform other diagnoses instead of a fault diagnosis, as described in detail later.

As shown in FIG. 1, the main apparatus 16 has an input/output unit 30, a processor 32, a storage unit 34, a display unit 36, and a data link connector 38.

The main apparatus 16 may comprise a laptop personal computer, a tablet computer, or a smartphone which is commercially available, for example. The main apparatus 16 does not need to be housed in a single casing, but may comprise a personal computer as a main apparatus and an auxiliary unit (link) as an interface for connection to the data collecting apparatus 18.

(1-3-1-2. Various Functions)

Figure 2:
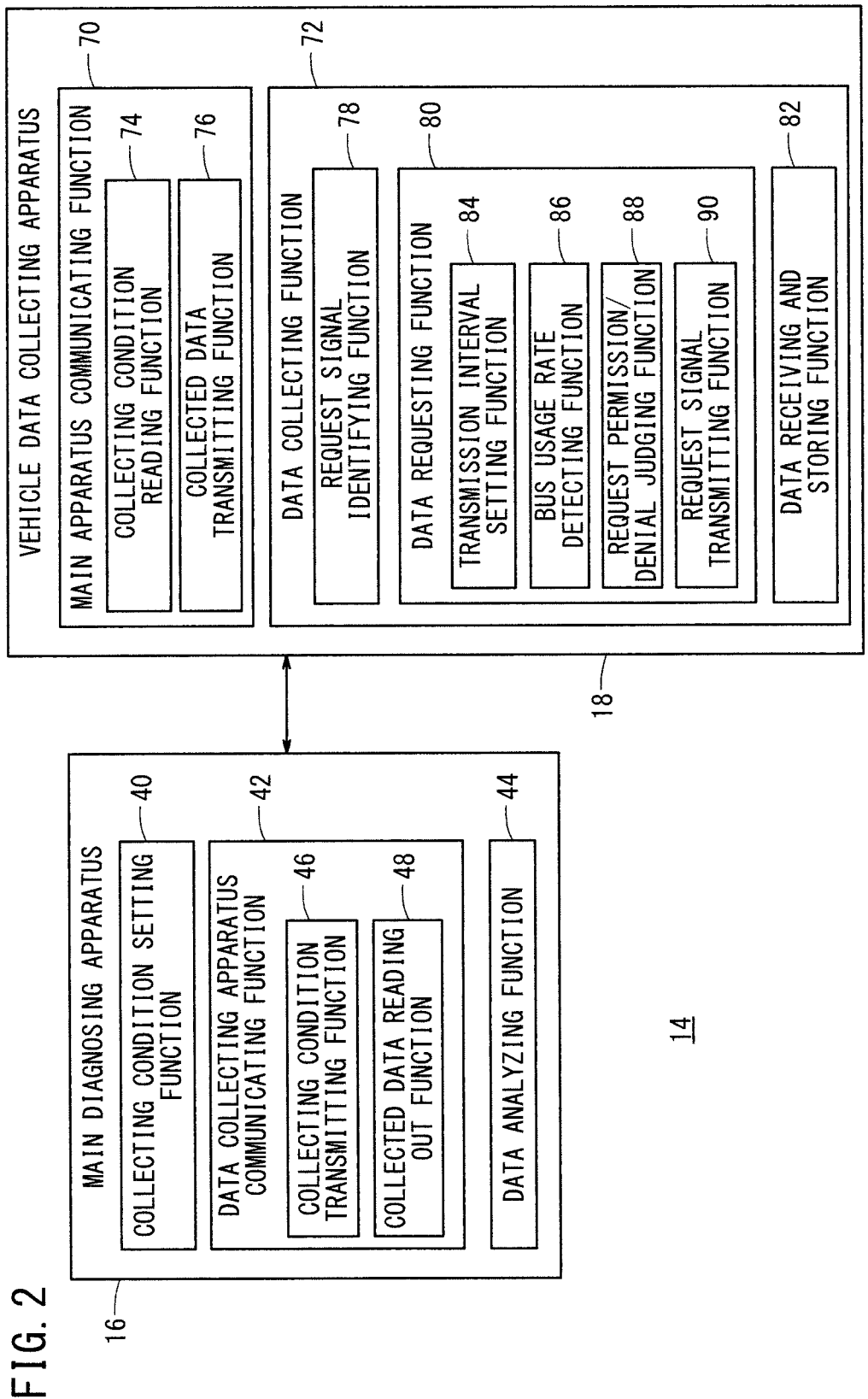
FIG. 2 is a diagram showing various functions of a main diagnosing apparatus and the vehicle data collecting apparatus.

FIG. 2 is a diagram showing various functions of the main diagnosing apparatus 16 and the data collecting apparatus 18. As shown in FIG. 2, the main diagnosing apparatus 16 has a collecting condition setting function 40, a data collecting apparatus communicating function 42, and a data analyzing function 44. The functions 40, 42, 44 are performed, e.g., by executing programs stored in the storage unit 34.

The collecting condition setting function 40 sets data collecting conditions which are conditions, e.g., the type, item, acquisition count, acquisition times, etc. of data D, for the data collecting apparatus 18 to collect data D.

The data collecting apparatus communicating function 42 is a function related to communications with the data collecting apparatus 18. The data collecting apparatus communicating function 42 includes a collecting condition transmitting function 46 for transmitting data collecting conditions to the data collecting apparatus 18 and a collected data reading out function 48 for reading data D from the data collecting apparatus 18.

The data analyzing function 44 analyzes data D acquired from the data collecting apparatus 18 for a fault diagnosis.

(1-3-2. Vehicle Data Collecting Apparatus 18)

(1-3-2-1. Overview)

The data collecting apparatus 18 collects driving parameter data D of the vehicle 12. As shown in FIG. 1, the data collecting apparatus 18 has an input/output unit 50, a processor 52, a storage unit 54, a display unit 56, and a data link cable 58. According to the present embodiment, the processor 52 includes a central processing unit (hereinafter referred to as "CPU 60") and a programmable logic device 62 (hereinafter referred to as "PLD 62"). The CPU 60 and the PLD 62 according to the present embodiment are used to detect a usage ratio [%] of the communication bus 22 (hereinafter referred to as "bus usage rate Rbus"). Details of the CPU 60 and the PLD 62 will be described later with reference to FIG. 7.

(1-3-2-2. Various Functions)

As shown in FIG. 2, the data collecting apparatus 18 has a main apparatus communicating function 70 and a data collecting function 72. The functions 70, 72 are performed by executing programs stored in the storage unit 54. The main apparatus communicating function 70 is a function related to communications with the main diagnosing apparatus 16, and the data collecting function 72 is a function related to collecting data D from the vehicle 12.

The main apparatus communicating function 70 has a collecting condition reading function 74 and a collected data transmitting function 76. The collecting condition reading function 74 is a function to read, from the main diagnosing apparatus 16, a condition under which the data collecting apparatus 18 collects data D (data collecting conditions). The collected data transmitting function 76 is a function to transmit data D collected by the data collecting apparatus 18 to the main diagnosing apparatus 16.

The data collecting function 72 has a request signal identifying function 78 (selecting and setting unit), a data requesting function 80, and a data receiving and storing function 82. The request signal identifying function 78 is a function to identify a data request signal Sreq to be transmitted. The data requesting function 80 is a function to request data D of a particular item from an ECU 20 which is a target requested for data D (hereinafter referred to as "target ECU 20tar"). The data receiving and storing function 82 is a function to receive data D that are sent from the target ECU 20tar in response to a data request signal Sreq and to store the received data D in the storage unit 54.

As shown in FIG. 2, the data requesting function 80 has a transmission interval setting function 84 (transmission interval setting unit), a bus usage rate detecting function 86 (bus usage rate detecting unit), a request permission/denial judging function 88, and a request signal transmitting function 90 (request signal transmitting unit).

The transmission interval setting function 84 sets transmission intervals [sec] for data request signals Sreq (hereinafter referred to as "data request signal transmission intervals I1" or "transmission intervals I1"). The bus usage rate detecting function 86 calculates a usage ratio of the communication bus 22 (bus usage rate Rbus). The request permission/denial judging function 88 judges whether to permit or deny the transmission of a data request signal Sreq based on the bus usage rate Rbus. The request signal transmitting function 90 sends a data request signal Sreq if its transmission is permitted.

[2. Contents of Driving Parameter Data D]

Operation parameter data D according to the present embodiment are used for a fault diagnosis, and may include the following data, for example.

For example, if the vehicle 12 is to be diagnosed for its driving state (related to the driving engine and the traction motor), the data collecting apparatus 18 collects data D acquired from the engine ECU and the motor ECU.

The data D acquired from the engine ECU include data representing a vehicle speed detected by a vehicle speed sensor, not shown, an temperature of an engine coolant detected by a temperature sensor, not shown, an engine rotational speed calculated by the engine ECU based on a crankshaft angle detected by a crankshaft angle sensor, not shown, an intake pressure detected by an intake pressure sensor, not shown, and various setting values in the engine ECU.

The data D acquired from the motor ECU include data representing a motor rotational speed calculated by the motor ECU based on an output signal from a resolver, not shown, a remaining energy level of a high-voltage battery for energizing the driving motor, and various setting values in the motor ECU.

[3. Collection of Driving Parameter Data D]

Various working procedures and a processing sequence for the collection of driving parameter data D will be described below.

(3-1. Advance Preparations)
(3-1-1. Overall Flow of Advance Preparations)

Figure 3:
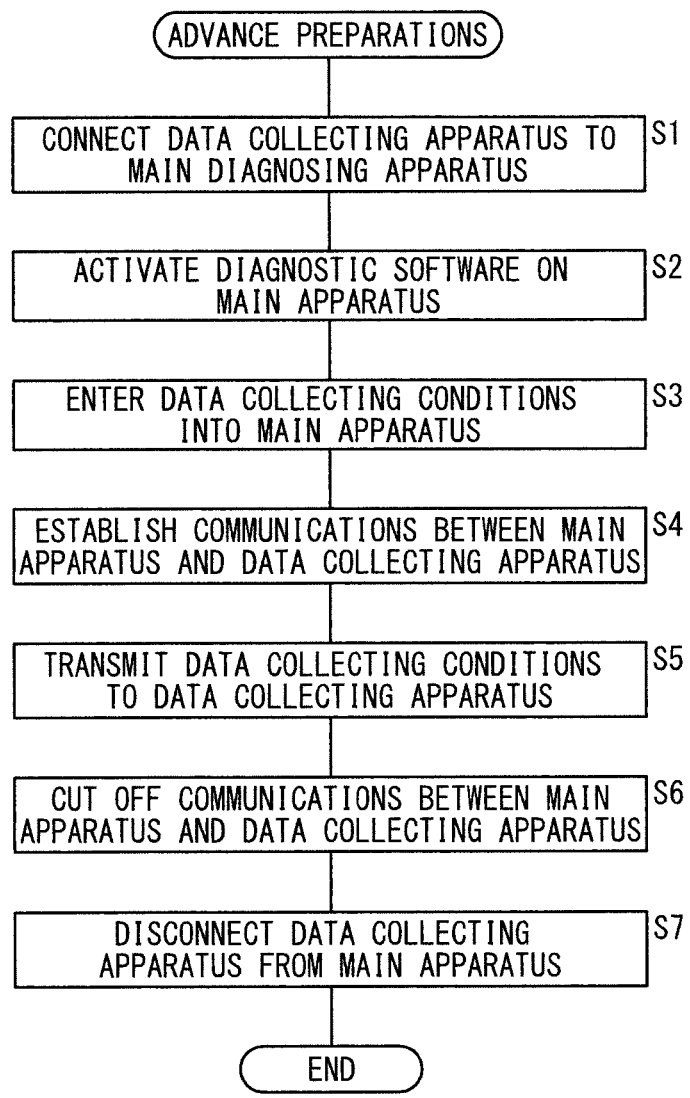
FIG. 3 is a flowchart of operator's working procedures and a processing sequence of the vehicle data collecting apparatus by way of example as advance preparations for collecting driving parameter data.

FIG. 3 is a flowchart of operator's working procedures and a processing sequence of the vehicle data collecting apparatus 18 by way of example as advance preparations for collecting driving parameter data D. In step S1, the operator (technician or the like) connects a data link connector 64 (FIG. 1) of the data link cable 58 of the data collecting apparatus 18 to the data link connector 38 of the main diagnosing apparatus 16.

In step S2, the operator operates the input/output unit 30 (mouse, keyboard, or the like) of the main diagnosing apparatus 16 to activate the diagnosing software that is used to collect driving parameter data D. When the diagnosing software is activated, the main diagnosing apparatus 16 displays a screen (not shown) about the collection of data D on the display unit 36. Steps S1, S2 may be switched around.

In step S3, the operator enters data collecting conditions through the displayed screen, as described in detail later.

In step S4, the operator requests through the displayed screen that communications be established between the main diagnosing apparatus 16 and the data collecting apparatus 18. In response to the request, the main apparatus 16 (data collecting apparatus communicating function 42) establishes communications with the data collecting apparatus 18. Steps S3, S4 may be switched around.

In step S5, the operator requests the main apparatus 16 to change the data collecting conditions for the data collecting apparatus 18 through the displayed screen. In response to the request, the main apparatus 16 (collecting condition transmitting function 46) changes the data collecting conditions for the data collecting apparatus 18 to the data collecting conditions entered in step S3.

In step S6, the operator requests through the displayed screen that communications be cut off between the main diagnosing apparatus 16 and the data collecting apparatus 18. In response to the request, the main apparatus (data collecting apparatus communicating function 42) cuts off communications with the data collecting apparatus 18.

In step S7, the operator disconnects the data link connector 64 of the data link cable 58 of the data collecting apparatus 18 from the data link connector 38 of the main diagnosing apparatus 16.

(3-1-2. Data Collecting Conditions)

The data collecting conditions entered in step S3 include, for example, a vehicle type, a vehicle model, a destination, specifications, a network type {CAN, LIN, FlexRay, or the like, or one of a plurality of CANs (F-CAN, B-CAN, etc.) if they are applicable}, the number of an input channel used by the data collecting apparatus 18, and the baud rate (hereinafter referred to as "baud rate Rbrt") [bps] of the network 24.

The data collecting conditions may also include contents (items) of data D, an ECU 20 (target ECU 20tar) which requests data D, a time for continuously acquiring data D (hereinafter referred to as "continuous data acquiring time Tcont" or "data acquiring time Tcont"), a period for continuously acquiring data D (hereinafter referred to as "continuous data acquiring period Ccont" or "data acquiring period Ccont"), and a total time required to collect data D (hereinafter referred to as "total data collecting time Ttotal" or "total time Ttotal").

According to the present embodiment, the data collecting apparatus 18 automatically sets transmission intervals (data request signal transmission intervals I1) for data request signals Sreq, as described in detail later.

Figure 4:
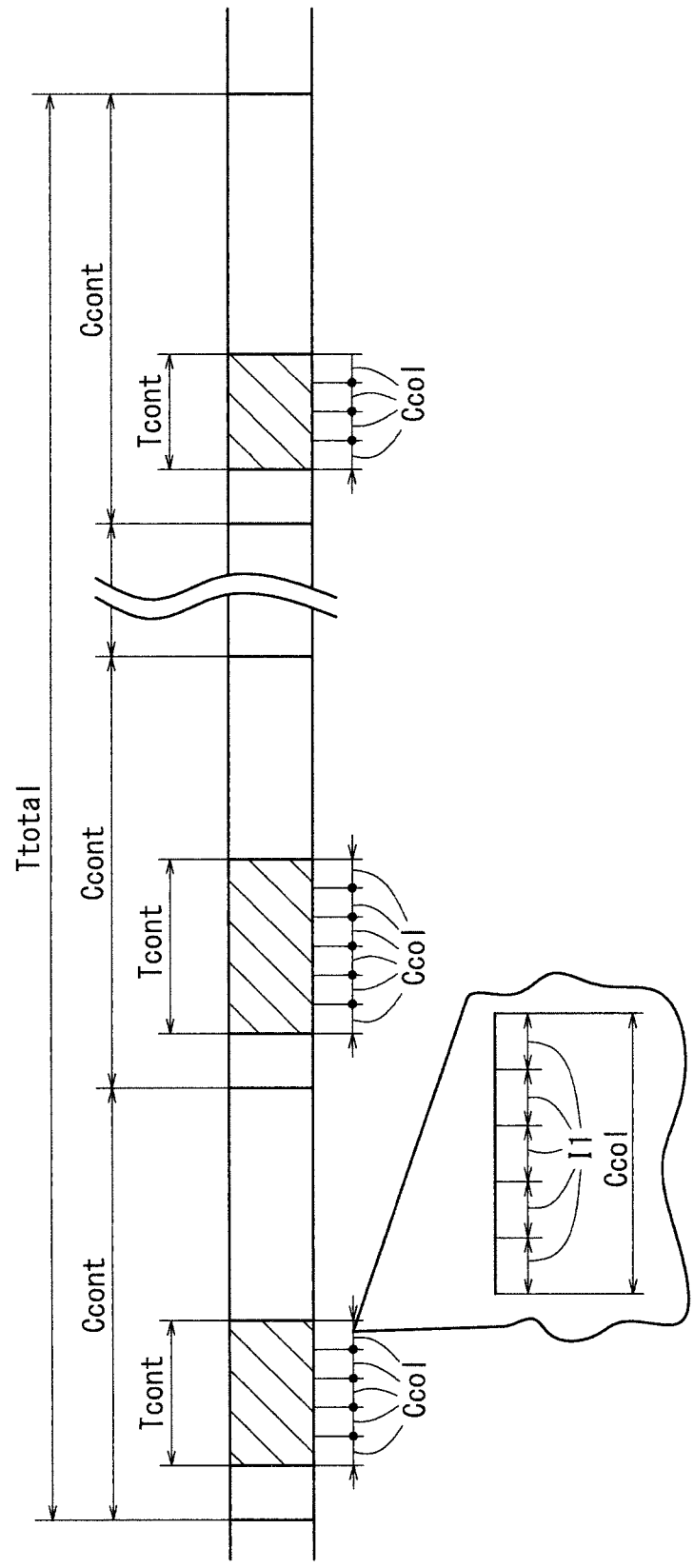
FIG. 4 is a diagram showing various times, intervals, and periods used according to the embodiment.

FIG. 4 is a diagram showing various times, periods, and intervals used according to the present embodiment. According to the present embodiment, as shown in FIG. 4, a plurality of transmission intervals I1 each for transmitting a data request signal Sreq are put together, making up an individual data acquiring period Ccol (data collecting period). The individual data acquiring period Ccol is a period required to acquire respective data D with respect to items selected to acquire the data D under data collecting conditions. If there are five items set, for example, then one piece of data D is acquired with respect to each of the five items, and a period for acquiring the five data D serves as an individual data acquiring period Ccol. The individual data acquiring period Ccol may be set to any period in the range from several tens milliseconds to several seconds. It should be noted that one data request signal Sreq is sent during a certain time in one transmission interval I1 (see FIGS. 6 and 10).

According to the present embodiment, the individual data acquiring period Ccol is of a fixed value whereas the transmission intervals I1 are variable. However, the individual data acquiring period Ccol may be changed when data collecting conditions are established in step S3 shown in FIG. 3.

A plurality of individual data acquiring periods Ccol are combined into a continuous data acquiring time Tcont. In FIG. 4, a continuous data acquiring time Tcont at the left end includes five individual data acquiring periods Ccol. However, such a continuous data acquiring time Tcont is illustrated by way of example only, and each continuous data acquiring time Tcont may be equal to the time during which the vehicle 12 is driven, e.g., the time during which the IGSW 28 stays on. If the vehicle 12 is driven in a different time zone or during a different time length, then the position or length of a continuous data acquiring time Tcont in a continuous data acquiring period Ccont is different. For example, in one continuous data acquiring time Tcont, e.g., 30 minutes, driving parameter data D are acquired a plurality of times, e.g., 60 times, with respect to all items to be collected.

A continuous data acquiring period Ccont represents an interval between a starting time of a continuous data acquiring time Tcont and a starting time of a next continuous data acquiring time Tcont. A continuous data acquiring period Ccont is set to 24 hours (one day), for example, though it may be set to another length.

In the event that a continuous data acquiring time Tcont is set to the time during which the vehicle 12 is driven, if the vehicle 12 is driven a plurality of times within a continuous data acquiring period Ccont, then there are a plurality of continuous data acquiring times Tcont present in the single continuous data acquiring period Ccont. The other time than a continuous data acquiring time Tcont in a continuous data acquiring period Ccont represents a time during which the vehicle 12 is not driven.

The total data collecting time Ttotal may be set to a number of days, e.g., in the range from several days to 30 days, for which the data collecting apparatus 18 is installed on the vehicle 12. The total data collecting time Ttotal is represented by a value calculated when the length of a data acquiring period Ccont is multiplied by the number of data acquiring periods Ccont that are included.

According to the present embodiment, rather than individually setting continuous data acquiring times Tcont, continuous data acquiring periods Ccont, etc., defect symptoms, and target ECUs 20*tar* and data D may be associated with each other in advance, and a target ECU 20*tar* and data D may be identified by entering a defect symptom that the user has complained about.

Specifically, defect symptoms, e.g., an unintended engine stall, an acceleration failure, an engine start failure, an engine knock, an engine noise, etc. are selectably displayed on a display screen. When the operator selects one of the displayed defect symptoms, data D to be collected may automatically be identified.

The data collecting conditions entered in step S3 may include a first threshold value TH_Rbus1 and a second threshold value TH_Rbus2, to be described in detail later, for the bus usage rate Rbus, etc.

(3-2. Operator's Working Procedures and a Processing Sequence for Collecting Driving Parameter Data D)

(3-2-1. Overall Flow of the Collection of Driving Parameter Data D)

Figure 5:
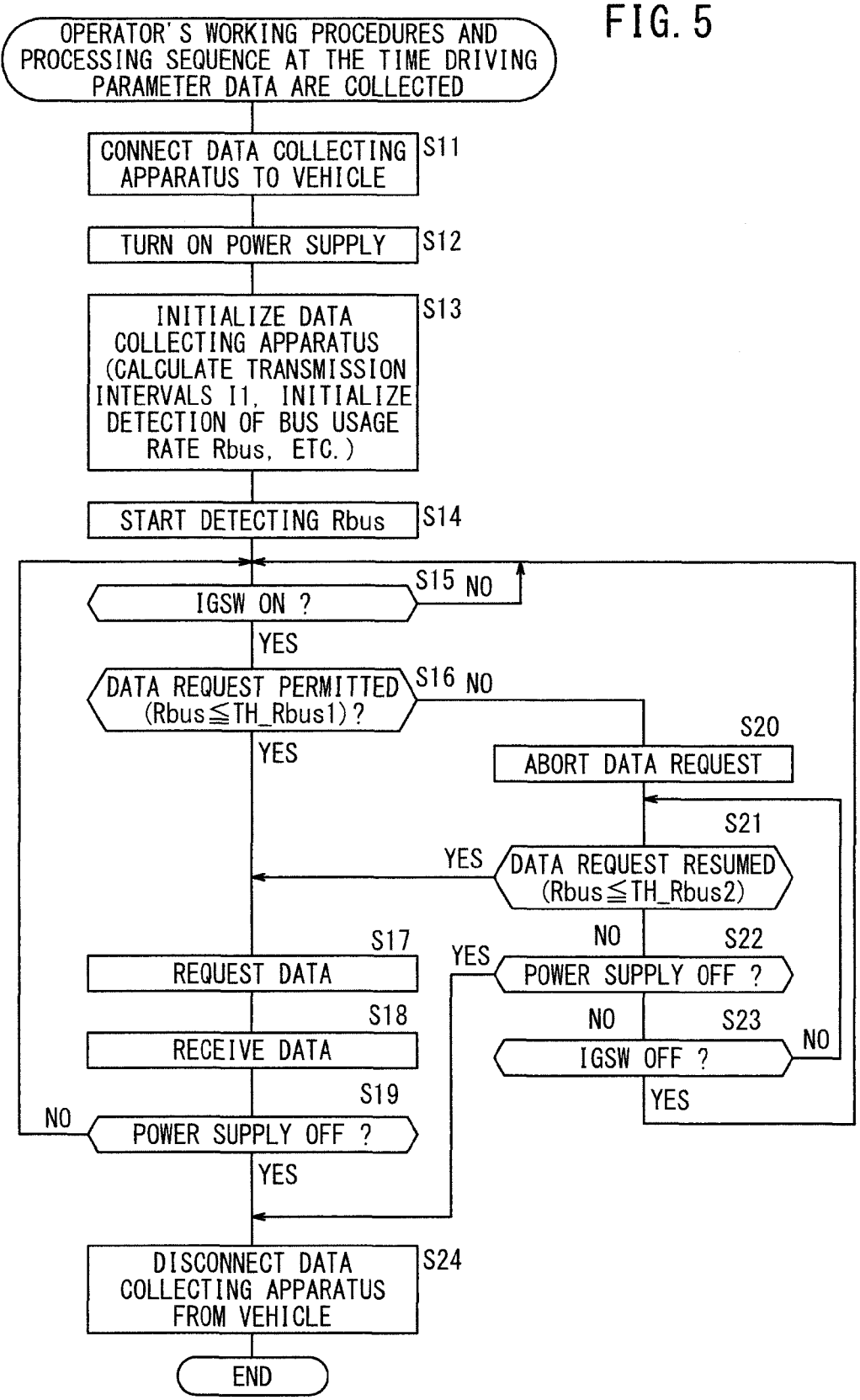
FIG. 5 is a flowchart of operator's working procedures and a processing sequence of the vehicle data collecting apparatus by way of example at the time driving parameter data are collected.
Figure 6:
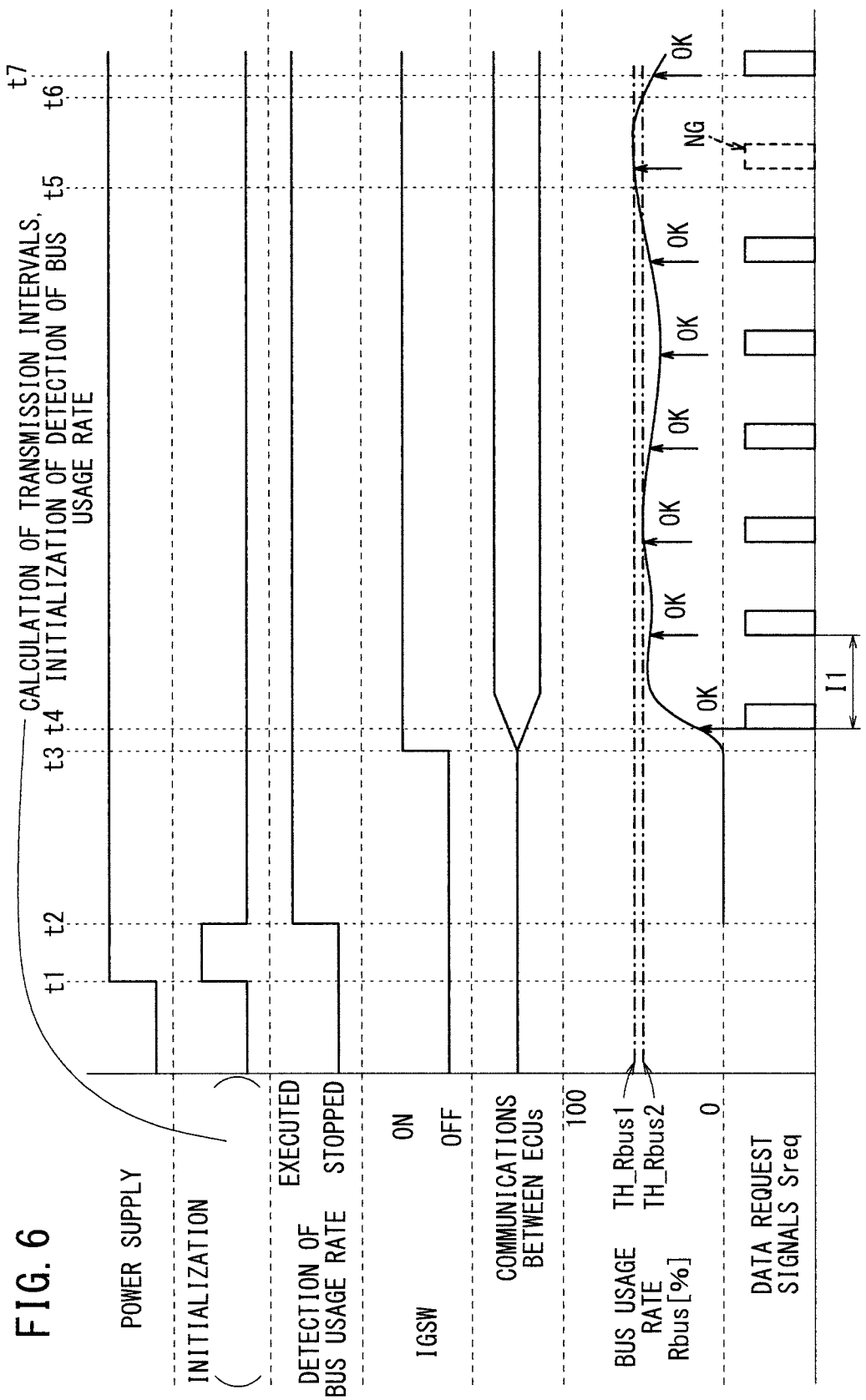
FIG. 6 is a timing chart of various operations and various signals of the vehicle data collecting apparatus for collecting driving parameter data.

FIG. 5 is a flowchart of operator's working procedures and a processing sequence of the vehicle data collecting apparatus 18 by way of example at the time driving parameter data D are collected. FIG. 6 is a timing chart of various operations and various signals of the vehicle data collecting apparatus 18 for collecting driving parameter data D.

In step S11 shown in FIG. 5, the operator (technician or the like) connects the data link connector 64 of the data link cable 58 of the data collecting apparatus 18 to the data link connector 26 of the vehicle 12.

In step S12, the operator turns on a start switch, not shown, on the data collecting apparatus 18 to energize the data collecting apparatus 18 (at time t1 in FIG. 6). Electric power for energizing the data collecting apparatus 18 may be supplied from a low-voltage battery, i.e., a 12V battery, not shown, on the vehicle 12. Alternatively, the data collecting apparatus 18 may have its own power supply. Irrespectively of whether electric power is supplied from the low-voltage battery to the data collecting apparatus 18 or the data collecting apparatus 18 has its own power supply, the data collecting apparatus 18 may automatically be energized at the time it is connected to the vehicle 12, so that the start switch may be omitted.

In step S13, the data collecting apparatus 18 performs an initializing process (from time t1 to time t2 in FIG. 6). The initializing process identifies the type of each data request signal Sreq to be transmitted in a present process of collecting data D, calculates transmission intervals I1 for data request signals Sreq, and initializes the detection of a bus usage rate Rbus. The identification of the type of each data request signal Sreq is established by the main apparatus 16 in step S3 shown in FIG. 3, and carried out by the request signal identifying function 78 based on the data collecting conditions transmitted to the data collecting apparatus 18 in step S5. A process of calculating transmission intervals I1 will be described later.

In step S14, the data collecting apparatus 18 (bus usage rate detecting function 86) starts to detect a bus usage rate Rbus (at time t2 in FIG. 6). The data collecting apparatus 18 continues to detect a bus usage rate Rbus until it is de-energized. A process of detecting a bus usage rate Rbus will be described later.

In step S15, the data collecting apparatus 18 (data collecting function 72) judges whether the IGSW 28 is on or not. If the IGSW 28 is off (S15: NO), then the data collecting apparatus 18 repeats step S15. However, though not shown in FIG. 5, when the data collecting apparatus 18 is de-energized, it finishes its present processing sequence. If the IGSW 28 is on (S15: YES, at time t3 in FIG. 6), the ECUs 20 start communicating with each other (see "COMMUNICATIONS BETWEEN ECUs" in FIG. 6). In step S16, the data collecting apparatus 18 (request permission/denial judging function 88) judges whether the transmission of a data request signal Sreq is permitted or denied, i.e., a request for data D is permitted or denied. Specifically, the data collecting apparatus 18 judges whether or not a bus usage rate Rbus detected by the bus usage rate detecting function 86 is equal to or smaller than a threshold value (hereinafter referred to as "data request grant judging threshold value TH_Rbus1" or "first threshold value TH_Rbus1") for judging whether a request for data D is permitted or denied.

If the transmission of a data request signal Sreq is permitted (S16: YES), then the data collecting apparatus (request signal transmitting function 90) transmits in step S17 a data request signal Sreq for requesting necessary driving parameter data D (at time t4, etc. in FIG. 6), as described in detail later. In response to the data request signal Sreq, a target ECU 20tar transmits driving parameter data D. In step S18, the data collecting apparatus (data receiving and storing function 82) receives the driving parameter data D.

In step S19, the data collecting apparatus 18 (data collecting function 72) judges whether or not the data collecting apparatus 18 is de-energized by the operator. If the data collecting apparatus 18 is not de-energized (S19: NO), then control goes back to step S15. If the data collecting apparatus 18 is de-energized (S19: YES), then the data collecting apparatus 18 finishes its data collecting process of the data D, and control goes to step S24.

In step S16, if the transmission of a data request signal Sreq is denied (S16: NO), then the data collecting apparatus 18 aborts the transmission of a data request signal Sreq (at time t5 in 6) in step S20.

In step S21, the data collecting apparatus 18 (request permission/denial judging function 88) judges whether the transmission of a data request signal Sreq (a request for data D) is to be resumed or not. Specifically, the data collecting apparatus 18 judges whether or not a bus usage rate Rbus detected by the bus usage rate detecting function 86 is equal to or smaller than a threshold value (hereinafter referred to as "data request resumption judging threshold value TH_Rbus2" or "second threshold value TH_Rbus2") for judging whether the transmission of a data request signal Sreq is to be resumed or not.

If the transmission of a data request signal Sreq is to be resumed (S21: YES, at time t6 in FIG. 6), then control goes to step S17, in which the data collecting apparatus 18 (request signal transmitting function 90) resumes the transmission of a data request signal Sreq (at time t7 in FIG. 6). In this case, the data collecting apparatus 18 starts transmitting a data request signal Sreq that should have been transmitted immediately after the transmission was aborted.

If the transmission of a data request signal Sreq is not to be resumed (S21: NO), then the data collecting apparatus 18 (data collecting function 72) judges whether the data collecting apparatus 18 is de-energized by the operator or not in step S22. If the data collecting apparatus 18 is not de-energized (S22: NO), then control goes to step S23. If the data collecting apparatus 18 is de-energized (S22: YES), then the data collecting apparatus 18 finishes its data collecting process of the data D, and control goes to step S24.

In step S23, the data collecting apparatus 18 (data collecting function 72) judges whether the IGSW 28 is turned off or not. If the IGSW 28 is not turned off (S23: NO), then control goes back to step S21. If the IGSW 28 is turned off (S23: YES), then control goes back to step S15.

If step S21 is repeated, the data collecting apparatus 18 (data collecting function 72) repeats step S21 at periodic intervals equal to the transmission intervals I1. When the bus usage rate Rbus becomes equal to or less than the second threshold value TH_Rbus2 (S21: YES), the data collecting apparatus 18 (data collecting function 72) resumes the transmission of a data request signal Sreq at the transmission intervals I1.

If the answer to step S19 is YES or the answer to step S22 is YES, then the operator disconnects the data collecting apparatus 18 from the vehicle 12, ending the collection of data D in step S24. If the data collecting apparatus 18 is automatically energized at the time it is connected to the vehicle 12, then the data collecting apparatus 18 may automatically be de-energized at the time it is disconnected from the vehicle 12. Stated otherwise, deenergizing the data collecting apparatus 18 in steps S19, S22 may be interpreted as disconnecting the data collecting apparatus 18 from the vehicle 12.

(3-2-2. Calculation of Transmission Intervals I1 for Data Request Signals Sreq)

The calculation of transmission intervals I1 for data request signals Sreq will be described below.

(3-2-2-1. Premises)

According to the present embodiment, as described above in relation to steps S3, S5 shown in FIG. 3, data collecting conditions are established for the data collecting apparatus 18. The data collecting conditions include the setting of driving parameter data D to be requested from a target ECU 20tar. Consequently, the number of items of data D to be collected (hereinafter referred to as "item number Ni") is identified.

According to the present embodiment, furthermore, a period (individual data acquiring period Ccol) (FIG. 4) for collecting one piece of data D with respect to all items to be collected is established. The continuous data acquiring time Tcont referred to above represents a length of time after the collection of data D is temporarily started until it is aborted, i.e., a length of time for which a plurality of data D are acquired with respect to each of all items to be collected. The individual data acquiring period Ccol represents a length of time (in the range from several tens milliseconds to several seconds) for which a piece of data D is acquired with respect to each of all items to be collected. A continuous data acquiring time Tcont includes a plurality of individual data acquiring periods Ccol (see FIG. 4). All continuous data acquiring times Tcont make up the total data collecting time Ttotal.

(3-2-2-2. Details of Calculation of Transmission Intervals I1)

According to the present embodiment, transmission intervals I1 for data request signals Sreq are set to equal values based on the item number Ni (the number of items of target data to be collected) in order to avoid congestion in the communication bus 22, i.e., in order to lower the bus usage rate Rbus. Specifically, each of transmission intervals I1 is calculated by dividing the individual data acquiring period Ccol by the item number Ni (I1=Ccol/Ni).

Since transmission intervals I1 are established as described above, data request signals Sreq are transmitted at equal intervals (see FIG. 6).

(3-2-3. Calculation of Bus Usage Rate Rbus)

The calculation of a bus usage rate Rbus will be described below.

Figure 7:
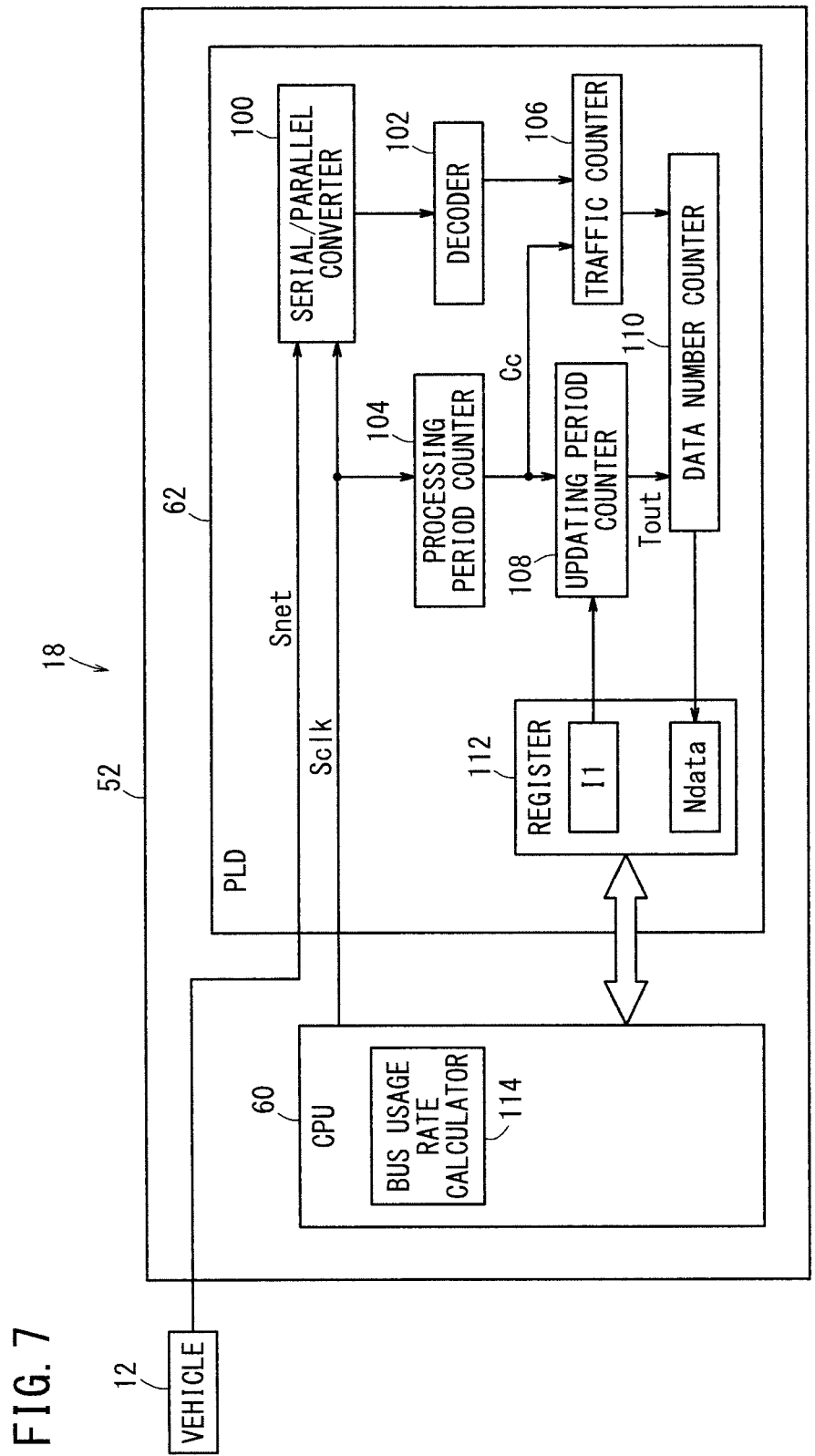
FIG. 7 is a block diagram showing a configuration of a processor of the vehicle data collecting apparatus for calculating a bus usage rate.

FIG. 7 is a block diagram showing a configuration of the processor 52 of the data collecting apparatus 18 for calculating a bus usage rate Rbus. As described above, the processor 52 of the data collecting apparatus 18 has the CPU 60 and the PLD 62.

As shown in FIG. 7, the PLD 62 includes a serial/parallel converter 100, a decoder 102, a processing period counter 104, a traffic counter 106, an updating period counter 108, a data number counter 110, and a register 112. The CPU 60 has a bus usage rate calculator 114.

The serial/parallel converter 100 converts various serial signals (serial network signals Snet) supplied from the ECUs 20 in the vehicle 12 through the communication bus 22 into parallel signals, and outputs the parallel signals, which may be of 10 bits, for example.

The decoder 102 decodes the parallel network signals Snet from the serial/parallel converter 100, and outputs the decoded network signals Snet to the traffic counter 106. The processing period counter 104 counts pulses of a clock signal Sclk from the CPU 60 and sends the count as a processing period (hereinafter referred to as "processing period Cc") to the traffic counter 106 and the updating period counter 108. The processing period Cc represents a processing period in the traffic counter 106 and the updating period counter 108.

The traffic counter 106 judges per each processing period Cc whether or not there are predetermined data (used to calculate a bus usage rate Rbus) in the network signals Snet decoded by the decoder 102, and outputs a count signal to the data number counter 110 each time the predetermined data are detected.

The updating period counter 108 sends an output timing signal Tout to the data number counter 110. Specifically, the updating period counter 108 is supplied with a transmission interval I1 to be used in the present processing cycle from the CPU 60 through the register 112. The updating period counter 108 identifies the time at which the transmission interval I1 has elapsed based on the processing period Cc from the processing period counter 104, and outputs the identified time as an output timing Tout to the data number counter 110.

The data number counter 110 increments its count each time the traffic counter 106 detects data, stores in the register 112 the count (hereinafter referred to as "data number per period Ndata" or "data number Ndata") at the time the data number counter 110 receives the output timing Tout from the updating period counter 108, and resets the count. As described above, the output timing Tout is set based on the transmission interval I1. Therefore, a data number Ndata has a value per transmission interval I1.

The register 112 temporarily stores the transmission interval I1 sent from the CPU 60 to the updating period counter 108 and the data number Ndata from the data number counter 110.

The bus usage rate calculator 114 of the CPU 60 reads the data number Ndata from the register 112, and calculates a bus usage rate Rbus according to the following equation (1):

$$Rbus = Ndata \times (I1/Rbrt) \times 100 \quad (1)$$

where Ndata represents a data number per period detected by the data number counter 110, I1 directly represents transmission intervals for data request signals Sreq and also represents an updating period for the data number Ndata, and Rbrt represents the baud rate of the intravehicular network 24 which is set in the main apparatus 16 in step S3 shown in FIG. 3 and sent to the data collecting apparatus 18 in step S5.

In the above equation (1), the transmission intervals I1 are used as the updating period for the data number Ndata. Therefore, the bus usage rate Rbus represents a value per transmission interval I1.

(3-3. Operator's Working Procedures and a Processing Sequence after Collecting Driving Parameter Data D)

Figure 8:
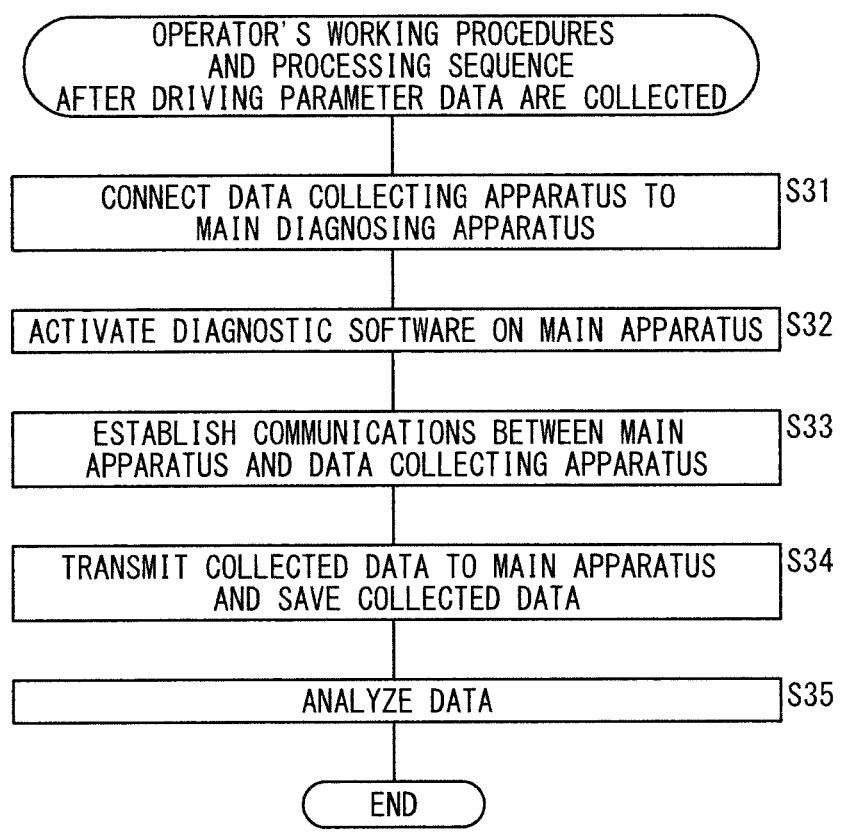
FIG. 8 is a flowchart of an operator's working sequence and a processing sequence of the vehicle data collecting apparatus by way of example after driving parameter data are collected.

FIG. 8 is a flowchart of an operator's operating sequence and a processing sequence of the vehicle data collecting apparatus 18 by way of example after driving parameter data D are collected. In step S31, the operator (technician or the like) connects the data link connector 64 of the data link cable 58 of the data collecting apparatus 18 to the data link connector 38 of the main diagnosing apparatus 16.

In step S32, the operator operates the input/output unit 30 (mouse, keyboard, or the like) of the main diagnosing apparatus 16 to activate the diagnosing software that is used to acquire driving parameter data D. When the diagnosing software is activated, the main diagnosing apparatus 16 displays a screen (not shown) about the acquisition of data D on the display unit 36. Steps S31, S32 may be switched around.

In step S33, the operator requests through the displayed screen that communications be established between the main diagnosing apparatus 16 and the data collecting apparatus 18. In response to the request, the main apparatus 16 (data collecting apparatus communicating function 42) establishes communications with the data collecting apparatus 18.

In step S34, the operator requests the main diagnosing apparatus 16 through the displayed screen to acquire collected driving parameter data D from the data collecting apparatus 18. In response to the request, the main apparatus 16 (collected data reading out function 48) requests the data collecting apparatus 18 to transmit collected driving parameter data D. In response to the request, the data collecting apparatus 18 (collected data transmitting function 76) transmits the collected driving parameter data D to the main apparatus 16. The main apparatus 16 (collected data reading out function 48) receives the data D from the data collecting apparatus 18 and saves the data D in the storage unit 34.

In step S35, the operator works on the displayed screen on the main apparatus 16 to analyze the driving parameter data D, thereby identifying the cause of the fault.

(3-4. Comparison Between the Present Embodiment and Comparative Example)

Figure 9:
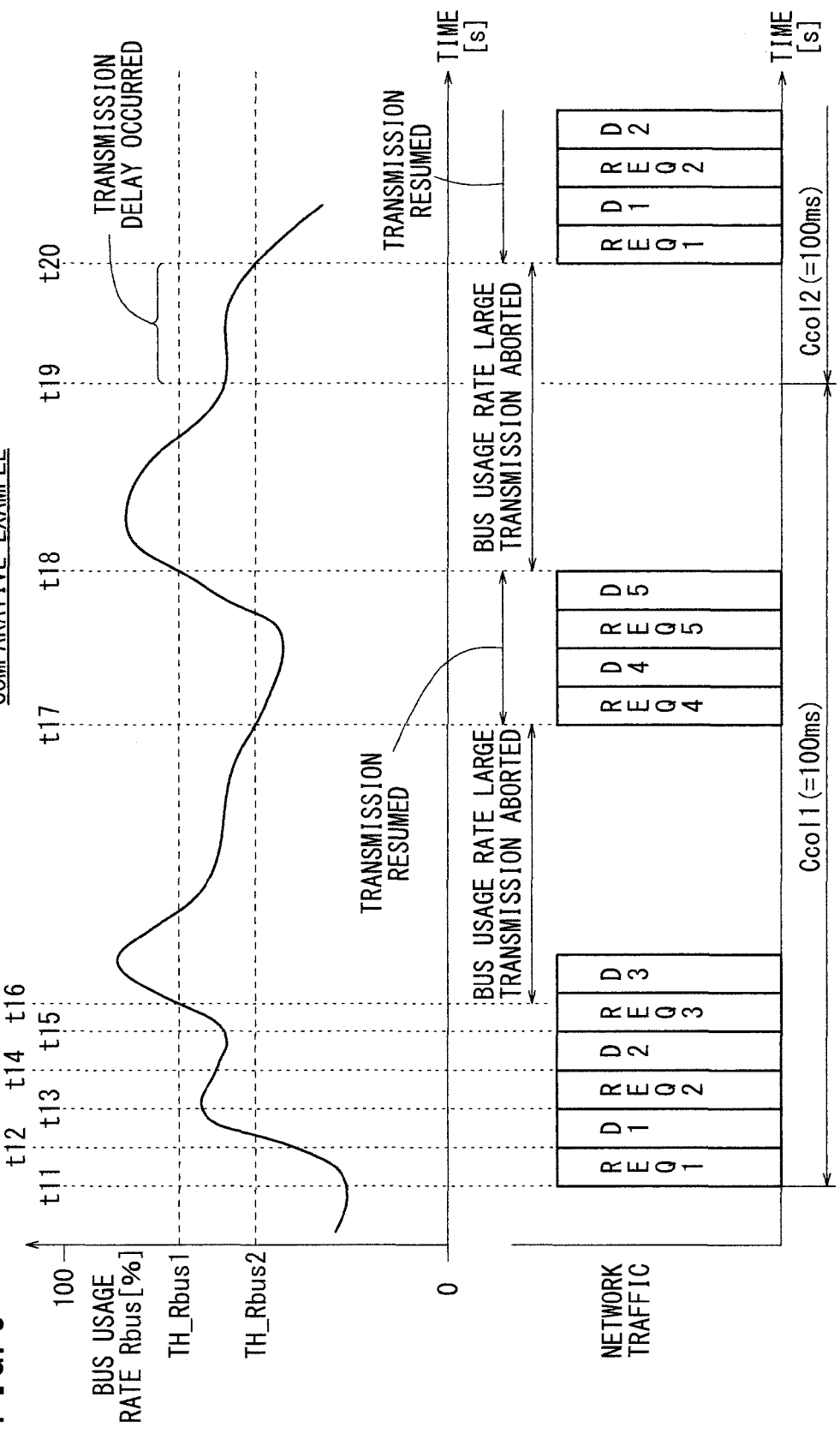
FIG. 9 is a diagram showing by way of example bus usage rates and network traffic at the time a configuration and a control process according to a comparative example are used.
Figure 10:
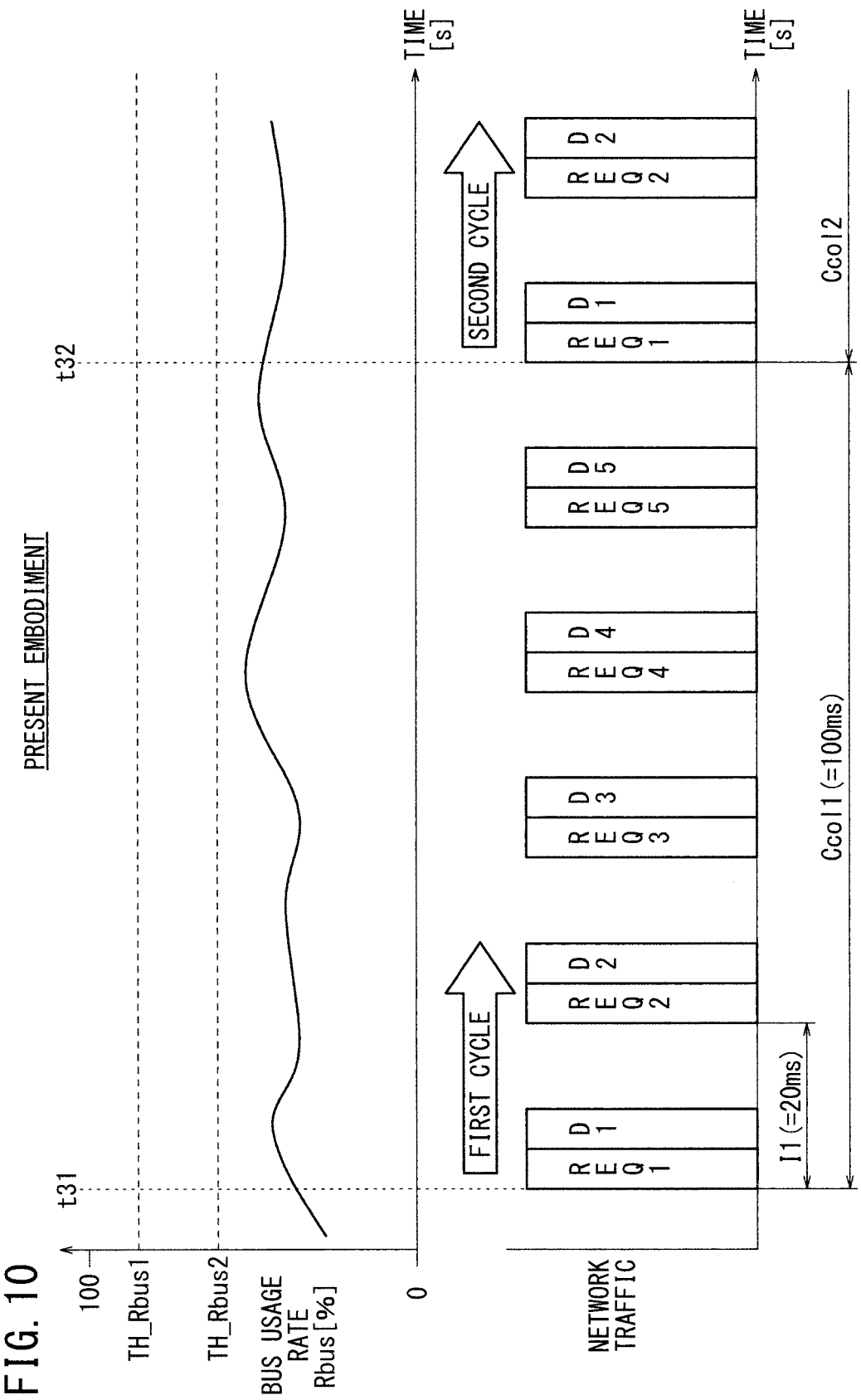
FIG. 10 is a diagram showing by way of example bus usage rates and network traffic at the time the configuration and the control process according to the embodiment are used.

FIG. 9 is a diagram showing by way of example bus usage rates Rbus and network traffic (exchange of signals or data) at the time a configuration and a control process according to a comparative example are used. FIG. 10 is a diagram showing by way of example bus usage rates Rbus and network traffic at the time the configuration and the control process according to the embodiment are used.

A data collecting apparatus (not shown) according to the comparative example shown in FIG. 9 and the data collecting apparatus 18 according to the present embodiment shown in FIG. 10 use individual data acquiring periods Ccol of the same length (e.g., 100 ms). The number of items (item number Ni) of data D to be collected by each of the data collecting apparatus according to the comparative example and the data collecting apparatus 18 according to the present embodiment is "5".

The data collecting apparatus according to the comparative example shown in FIG. 9 sends data request signals Sreq and receives driving parameter data D as needed. Specifically, after the data collecting apparatus according to the comparative example has sent the first data request signal Sreq at t11 (corresponding to "REQ1" on the left side in FIG. 9), it receives the first piece of data D in response thereto at time t12 (corresponding to "D1" on the left side in FIG. 9). When the reception of the first piece of data D is finished, the data collecting apparatus according to the comparative example sends the second data request signal Sreq at t13 (corresponding to "REQ2" on the left side in FIG. 9), after which it receives the second piece of data D in response thereto at time t14 (corresponding to "D2" on the left side in FIG. 9). The data collecting apparatus according to the comparative example similarly sends third and subsequent data request signals Sreq and similarly receives third and subsequent pieces of data D in that after the data collecting apparatus has received data D, it sends a next data request signal Sreq.

As with the present embodiment, if the bus usage rate Rbus exceeds the first threshold value TH_Rbus1, then the data collecting apparatus according to the comparative example aborts the transmission of a data request signal Sreq, and if the bus usage rate Rbus subsequently becomes equal to or smaller than the second threshold value TH_Rbus2, the data collecting apparatus according to the comparative example resumes the transmission of data request signals Sreq (see FIG. 5).

In the example shown in FIG. 9, the bus usage rate Rbus exceeds the first threshold value TH_Rbus1 at time t16 while the third data request signal Sreq is being sent. Therefore, the data collecting apparatus according to the comparative example aborts the transmission of fourth and subsequent data request signals Sreq. The reason why the bus usage rate Rbus exceeds the first threshold value TH_Rbus1 seems to be the fact that a plurality of data request signals Sreq and data D pass intensively through the communication bus 22 (though the item number Ni is relatively small in FIG. 9, data request signals Sreq and data D pass more intensively through the communication bus 22 as the item number Ni increases).

At time t17, when the bus usage rate Rbus subsequently becomes equal to or smaller than the second threshold value TH_Rbus2, the data collecting apparatus according to the comparative example resumes the transmission of data request signals Sreq and the reception of data D.

At time t18, the bus usage rate Rbus exceeds the first threshold value TH_Rbus1. Therefore, the data collecting apparatus according to the comparative example aborts the transmission of subsequent data request signals Sreq.

At time t19, the first individual data acquiring period Ccol ("Ccol1" in FIG. 9) comes to an end. However, since the bus usage rate Rbus exceeds the second threshold value TH_Rbus2, the data collecting apparatus according to the comparative example is unable to send the first data request signal Sreq even though it is in the second individual data acquiring period Ccol ("Ccol2" in FIG. 9).

At time t20, when the bus usage rate Rbus becomes equal to or smaller than the second threshold value TH_Rbus2, data collecting apparatus according to the comparative example resumes the transmission of a data request signal Sreq (corresponding to "REQ1" on the right side in FIG. 9) and the reception of data D (corresponding to "D1" on the right side in FIG. 9). Therefore, a delay occurs between time t19 and time t20 in sending a data request signal Sreq.

The data collecting apparatus 18 according to the present embodiment shown in FIG. 10 sets transmission intervals I1 for data request signals Sreq to equal values based on the item number Ni. Specifically, the data collecting apparatus 18 sets transmission intervals I1 to a value calculated by dividing the individual data acquiring period Ccol by the item number Ni (=5), e.g., sets transmission intervals I1 to 20 ms if the individual data acquiring period Ccol is 100 ms.

Therefore, the data collecting apparatus 18 according to the present embodiment is capable of avoiding an abrupt increase in the bus usage rate Rbus, and keeps the bus usage rate Rbus equal to or smaller than first threshold value TH_Rbus1 throughout the first individual data acquiring period Ccol1 between time t31 and t32 in FIG. 10. The data collecting apparatus 18 can thus enter the next individual data acquiring period Ccol2 without aborting the transmission of a data request signal Sreq. The data collecting apparatus 18 does not cause a delay in sending a data request signal Sreq which occurs according to the comparative example shown in FIG. 9.

[4. Advantages of the Present Embodiment]

According to the present embodiment, as described above, if the bus usage rate Rbus of the intravehicular network 24 is judged as being smaller than the first threshold value TH_Rbus1 (S16 in FIG. 5: YES), then the data collecting apparatus 18 sends a data request signal Sreq to a target ECU 20*tar* (S17). Therefore, the data collecting apparatus 18 can collect driving parameter data D without limiting communications between the ECUs 20 or collect driving parameter data D while minimizing limitations on communications between the ECUs 20, at the time of driving the vehicle 12. It is thus easy to prevent data communications for driving the vehicle from being congested while the vehicle is being driven.

According to the present embodiment, furthermore, the data collecting apparatus 18 sends data request signals Sreq at equal transmission intervals I1 that are established based on the item number Ni of the data request signals Sreq (see FIGS. 6 and 10). Consequently, it is possible to prevent the bus usage rate Rbus from being temporarily increased sharply by the transmission of data request signals Sreq and the outputting of driving parameter data D. The data collecting apparatus 18 is thus capable of avoiding an interruption of communications owing to a temporary sharp increase in the bus usage rate Rbus, and makes it easy to keep continuity of driving parameter data D.

According to the present embodiment, the data collecting apparatus 18 (bus usage rate detecting function 86) calculates a bus usage rate Rbus using the data number per period Ndata (communication volume on the intravehicular network 24) that represents the count of the data number counter 110 detected at the same intervals as the transmission intervals I1. When the data collecting apparatus 18 (data requesting function 80) judges that the bus usage rate Rbus exceeds the first threshold value TH_Rbus1, it aborts the transmission of a data request signal Sreq, and judges whether or not the bus usage rate Rbus subsequently becomes smaller than the second threshold value TH_Rbus2 at the same intervals as the transmission intervals I1. When the bus usage rate Rbus subsequently becomes smaller than the second threshold value TH_Rbus2, the data collecting apparatus 18 (data requesting function 80) resumes the transmission of data request signals Sreq at the transmission intervals I1.

Consequently, the transmission periods (transmission intervals I1) of the data request signals Sreq do not change around the time when the transmission of a data request signal Sreq is aborted due to an increase in the bus usage rate Rbus. Even if driving parameter data D drop out due to the aborted transmission of a data request signal Sreq, it is easy to interpolate the driving parameter data D that have dropped out. The driving parameter data D that have dropped out may be interpolated by estimating the driving parameter data D that have dropped out from data D (having the same items) before and after the driving parameter data D that have dropped out, e.g., by averaging the data D before and after the driving parameter data D that have dropped out if the data D are represented by numerical values, or by successively displaying on a screen the data D (having the same items) before and after the driving parameter data D that have dropped out while displaying no data at the time when the data D have dropped out.

According to the present embodiment, the main diagnosing apparatus 16 (collecting condition setting function 40) can select and set data request signals Sreq for driving parameter data D altogether with respect to each defect symptom. Therefore, it is simple to select data request signals Sreq to be sent and to set transmission intervals I1.

B. Modifications:

The present invention is not limited to the above embodiment, but may employ various arrangements based on the description of the present disclosure. For example, the present invention may employ the following arrangements:

[1. Object to which the Invention is Applicable]

In the above embodiment, the external diagnosing machine 14 is combined with the vehicle 12. However, the external diagnosing machine 14 may be used with a stand-alone apparatus (e.g., a mobile body such as a ship, an aircraft, or the like, or various manufacturing apparatus) having a local network to which a plurality of electronic control units are connected.

[2. Vehicle 12]

In the above embodiment, a CAN is used as the intravehicular network 24. However, a network such as LIN, FlexRay, or the like may be used as the intravehicular network 24.

[3. External Diagnosing Machine 14]

(3-1. Diagnostic Purpose)

In the above embodiment, the external diagnosing machine 14 performs a fault diagnosis on the vehicle 12. However, insofar as the data collecting apparatus 18 collects driving parameter data D, the external diagnosing machine 14 may make other vehicle diagnoses. For example, the external diagnosing machine 14 may perform a checkup for confirming a deteriorated or operating state of each vehicle-mounted device or a driving skill diagnosis for diagnosing drivers for driving skills (e.g., an accelerating action, a braking action). Therefore, driving parameter data D may not be limited to data used for a fault diagnosis, but may be data used for other diagnoses.

(3-2. Main Diagnosing Apparatus 16)

In the above embodiment, the main diagnosing apparatus 16 may comprise a laptop personal computer, a tablet computer, or a smartphone which is commercially available, for example, and may be constructed as a single unit. However, the main diagnosing apparatus 16 is not limited to those devices, but may comprise a personal computer as a main apparatus and an auxiliary unit (link) as an interface for connection to the data collecting apparatus 18.

In the above embodiment, the diagnostic software used by the main diagnosing apparatus 16 is prerecorded in the storage unit 34. However, the diagnostic software may be downloaded from an external source, e.g., an external server that can be accessed through a public network, or may be executed using a download-free ASP (Application Service Provider).

(3-3. Data Collecting Apparatus 18)

(3-3-1. Configuration)

In the above embodiment, the data collecting apparatus 18 is separate from the main diagnosing apparatus 16. However, the main apparatus 16 may have and perform the functions of the data collecting apparatus 18.

In the above embodiment, the data collecting apparatus 18 is connected to the intravehicular network 24 from outside of the vehicle 12, i.e., the data collecting apparatus 18 is an external apparatus. However, the data collecting apparatus 18 may be incorporated in the vehicle 12.

In the above embodiment, the main diagnosing apparatus 16 and the data collecting apparatus 18 communicate with each other via a wired communication link, and the vehicle 12 and the data collecting apparatus 18 communicate with each other via a wired communication link. However, a wireless communication link may be used for communications between some of those entities. For example, the main diagnosing apparatus 16 and the data collecting apparatus 18 may communicate with each other via a wireless communication link. Alternatively, a wireless communication unit, not shown, connected to the intravehicular network 24 may be installed in the vehicle 12, and the data collecting apparatus 18 may communicate with the wireless communication unit via a wireless communication link, and may communicate with each of the ECUs 20 through the wireless communication unit.

(3-3-2. Transmission Intervals I1)

In the above embodiment, each of the transmission intervals I1 for data request signals Sreq is of a value calculated by dividing the individual data acquiring period Ccol by the item number Ni, i.e. the number of pieces of data D assigned to the individual data acquiring period Ccol. However, each of the transmission intervals I1 is not limited to such a value insofar as it prevents the bus usage rate Rbus from increasing abruptly or it uniformizes the traffic on the communication bus 22. For example, each of the transmission intervals I1 for data request signals Sreq may be of a value calculated by dividing the continuous data acquiring time Tcont (see FIG. 4) by the number of pieces of data D that are collected in the continuous data acquiring time Tcont.

Alternatively, each of the transmission intervals I1 may be made variable depending on the bus usage rate Rbus. For example, when the bus usage rate Rbus increases, e.g., when the bus usage rate Rbus exceeds a predetermined threshold value, each of the transmission intervals I1 may be increased, and when the bus usage rate Rbus decreases, e.g., when the bus usage rate Rbus becomes smaller than a predetermined threshold value, each of the transmission intervals I1 may be reduced.

(3-3-3. Detection of Bus Usage Rate Rbus)

In the above embodiment, the bus usage rate Rbus is calculated at the same intervals as the transmission intervals I1. However, the bus usage rate Rbus may be calculated at intervals longer or shorter than the transmission intervals I1.

In the above embodiment, the data number per period Ndata (communication volume on the intravehicular network 24) used in the detection of the bus usage rate Rbus represents the count of the data number counter 110 detected at the same intervals as the transmission intervals I1. However, the data number per period Ndata may be detected at other intervals. For example, the data number per period Ndata may be detected at shorter intervals than the transmission intervals I1. In this case, such intervals, i.e., shorter intervals than the transmission intervals I1, are used instead of the transmission intervals I1 in the above equation (1).

(3-3-4. Aborting and resuming data request signals Sreq)

In the above embodiment, the second threshold value TH_Rbus2 for the bus usage rate Rbus is smaller than the first threshold value TH_Rbus1. However, the second threshold value TH_Rbus2 may be the same as the first threshold value TH_Rbus1. Stated otherwise, it is possible to judge whether a data request signal Sreq is aborted or resumed, using only the first threshold value TH_Rbus1.

The invention claimed is:

1. An external vehicle data collecting apparatus removably connected externally to an intravehicular network to which a plurality of electronic control units, hereinafter referred to as ECUs, are connected in a vehicle, for transmitting a plurality of data request signals for requesting driving parameter data representing operating states of various components of the vehicle while the vehicle is being driven, to at least one of the ECUs, receiving driving parameter data in response to the data request signals, and storing the received driving parameter data in a storage unit, the external vehicle data collecting apparatus comprising:

a bus usage rate detecting unit connected to the intravehicular network and configured to detect a bus usage rate of the intravehicular network;

a selecting and setting unit configured to select and set the data request signals to be transmitted to the at least one of the ECUs;

a transmission interval setting unit configured to set equal transmission intervals in a predetermined period with respect to each of the data request signals based on the number of the data request signals set by the selecting and setting unit; and a request signal transmitting unit configured to transmit the data request signals at the equal transmission intervals if the bus usage rate is judged as being smaller than a first threshold value.

2. The external vehicle data collecting apparatus according to claim 1, wherein the bus usage rate detecting unit calculates the bus usage rate by detecting a communication volume on the intravehicular network at same intervals as the equal transmission intervals; and the request signal transmitting unit aborts transmission of the data request signals if the bus usage rate is judged as exceeding the first threshold value, judges at the equal transmission intervals whether the bus usage rate is smaller than a second threshold value that is equal to or smaller than the first threshold value, and resumes the transmission of the data request signals at the equal transmission intervals if the bus usage rate becomes smaller than the second threshold value.

3. The external vehicle data collecting apparatus according to claim 1, wherein the selecting and setting unit selects and sets data request signals for driving parameter data altogether with respect to each defect symptom.

4. A vehicle data collecting method in which a vehicle data collecting apparatus connected externally to an intravehicular network to which a plurality of electronic control units, hereinafter referred to as ECUs, are connected in a vehicle, transmits a plurality of data request signals for requesting driving parameter data representing operating states of various components of the vehicle while the vehicle is being driven, to at least one of the ECUs, receives driving parameter data in response to the data request signals, and stores the received driving parameter data in a storage unit, the vehicle data collecting method comprising:

a bus usage rate detecting step of detecting a bus usage rate of the intravehicular network by the vehicle data collecting apparatus connected to the intravehicular network;

a selecting and setting step of selecting and setting the data request signals to be transmitted from the vehicle data collecting apparatus to the at least one of the ECUs;

a transmission interval setting step of setting equal transmission intervals in a predetermined period with respect to each of the data request signals based on the number of the data request signals set by the selecting and setting step; and a request signal transmitting step of transmitting the data request signals at the equal transmission intervals if the bus usage rate is judged as being smaller than a first threshold value.

5. A vehicle data collecting method for collecting intravehicular data for use in a vehicle diagnosis that is at least one of a fault diagnosis, a checkup, and a driving skill diagnosis to be performed externally on a vehicle having an intravehicular network to which a plurality of electronic control units, hereinafter referred to as ECUs, are connected, the vehicle data collecting method comprising:

an item setting step of setting a diagnostic item to be diagnosed by an external diagnosing machine;

a request signal identifying step of identifying data request signals with respect to a plurality of items for requesting any of the ECUs for the intravehicular data about the plurality of items corresponding to the diagnostic item;

a data requesting step of transmitting a plurality of the data request signals with respect to the plurality of items to at least one of the ECUs from the external diagnosing machine or a vehicle-mounted link which operates in response to a command from the external diagnosing machine;

an intravehicular data transmitting step of transmitting a plurality of the intravehicular data from each of the ECUs which have received the data request signals to the external diagnosing machine or the vehicle-mounted link; and an intravehicular data storing step of storing the intravehicular data which have been received directly from the ECUs or the intravehicular data which have been received through the vehicle-mounted link, in the external diagnosing machine;

wherein the data requesting step comprises:

a transmission interval setting step of setting transmission intervals for the data request signals with respect to the plurality of items which are identified depending on the diagnostic item;

a bus usage rate detecting step of detecting a bus usage rate of the intravehicular network;

a bus usage judging step of judging whether the bus usage rate is smaller than a first threshold value or not; and a request signal transmitting step of transmitting the data request signals at the transmission intervals if the bus usage rate is judged as being smaller than the first threshold value; and wherein the transmission interval setting step sets the transmission intervals for transmitting the data request signals with respect to the plurality of items at equal intervals in a data collecting period which is a period established to acquire each piece of the intravehicular data with respect to the plurality of items.

* * * * *